Jan. 22, 1963    G. P. FELTS    3,074,597
PIGMENT MEASURING AND DISPENSING DEVICE
Filed Nov. 21, 1958    4 Sheets-Sheet 1

INVENTOR.
GORDON P. FELTS
BY
Eugene O. Weber
ATTORNEY

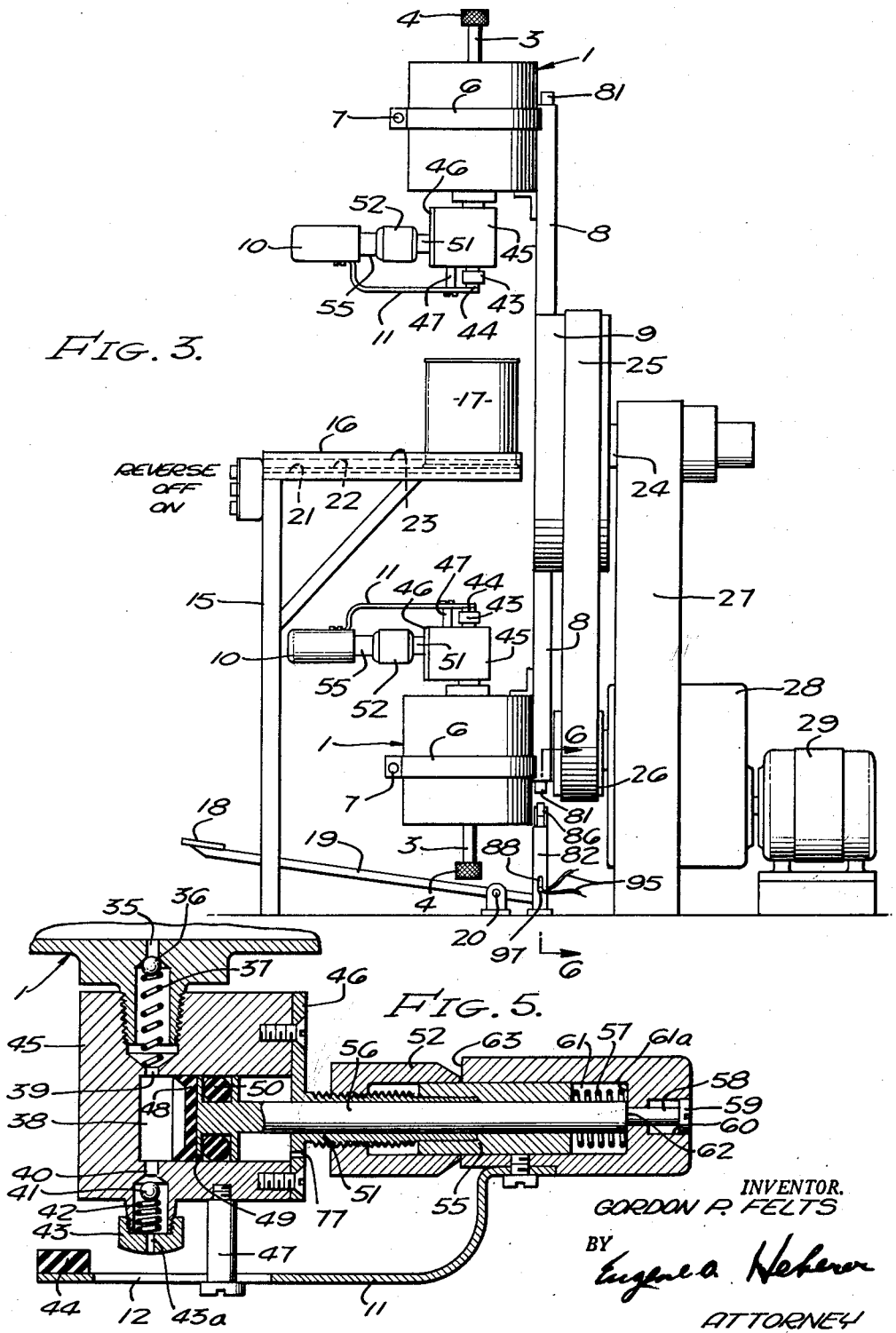

Jan. 22, 1963 G. P. FELTS 3,074,597
PIGMENT MEASURING AND DISPENSING DEVICE
Filed Nov. 21, 1958 4 Sheets-Sheet 3
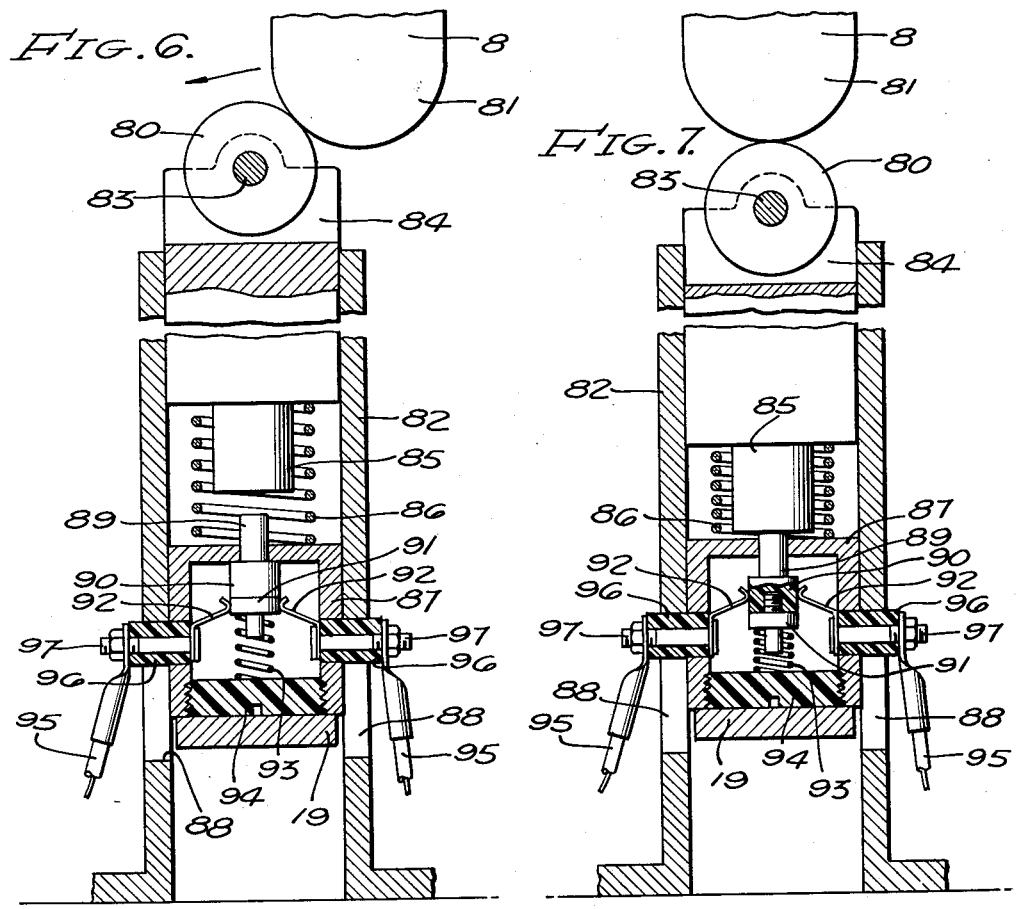
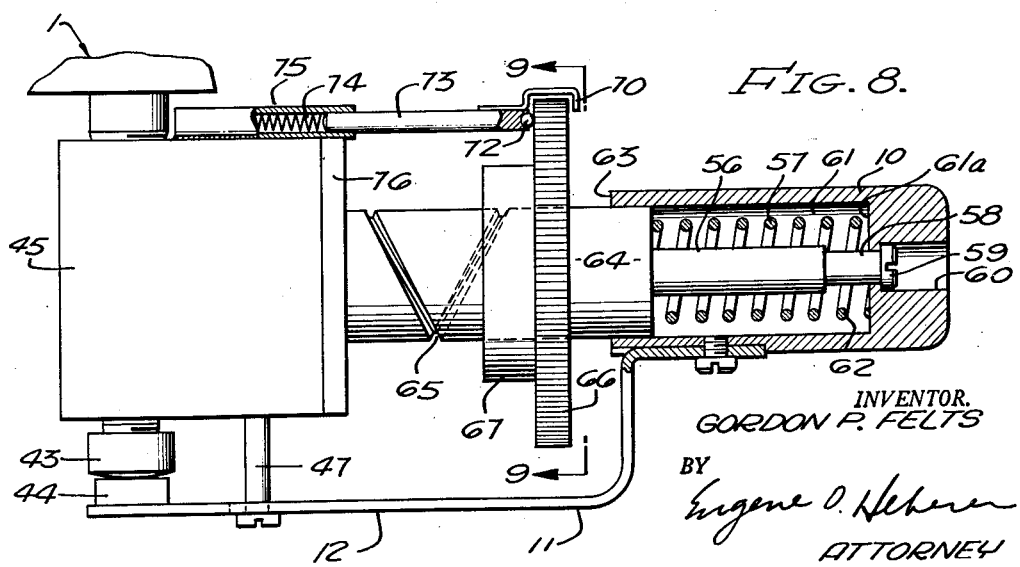
INVENTOR.
GORDON P. FELTS
BY
Eugene O. Heberer
ATTORNEY Jan. 22, 1963  G. P. FELTS  3,074,597
PIGMENT MEASURING AND DISPENSING DEVICE
Filed Nov. 21, 1958  4 Sheets-Sheet 4
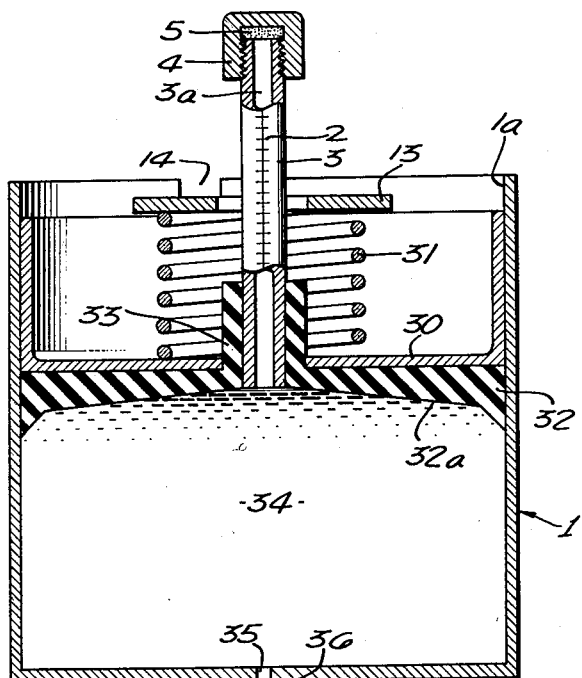
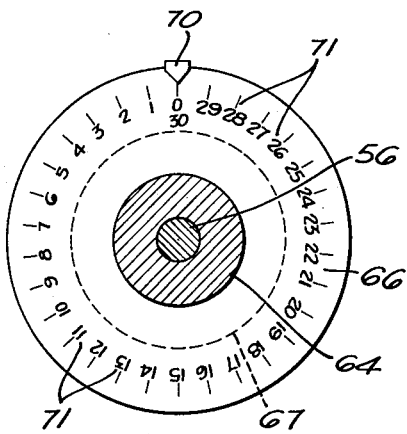
FIG. 9.
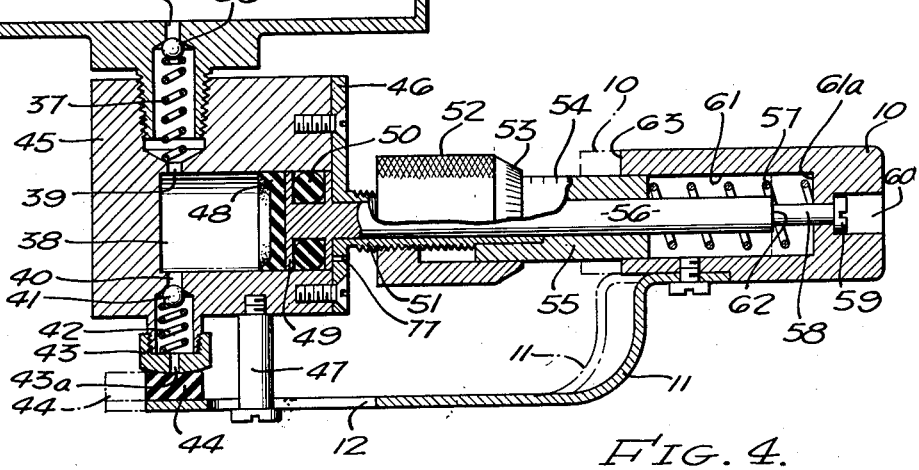
FIG. 4.
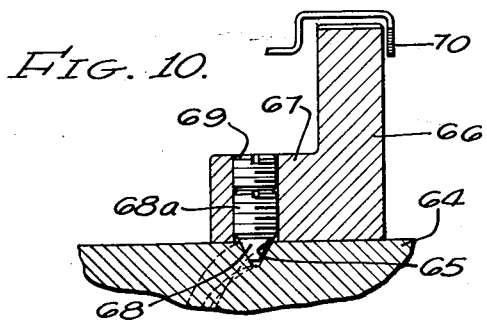
FIG. 10.
INVENTOR.
GORDON P. FELTS
BY
Eugene O. Heberer
ATTORNEY

United States Patent Office 3,074,597
Patented Jan. 22, 1963

3,074,597
PIGMENT MEASURING AND
DISPENSING DEVICE
Gordon P. Felts, Sierra Madre, Calif., assignor of forty-seven and one-half percent to Microdot Inc., South Pasadena, Calif., a corporation of California, and ten percent to Leland A. Sidwell, Whittier, Calif.
Filed Nov. 21, 1958, Ser. No. 775,554
19 Claims. (Cl. 222—43)

This invention relates to a dispensing device and is more particularly directed to a paint pigment storage, measuring and dispensing device in which the paint pigments are continually agitated so as to remain continually homogeneous both as to color and viscosity.

In most retail paint stores, color is added to a white base paint as it is purchased by the customer. The pigments which supply the color are dispensed from tubes that are emptied into a can of white base paint, and the colored paint is prepared for the customer as he waits. The tube method of adding a color to paint is very cumbersome and undesirable. One of the disadvantages of the latter method is that the paint store must carry an infinite number of tubes of pigment to mix the colors desired because if one tube containing a required color is unavailable in the store, the order could not be completely filled. Moreover, if the order was only partially filled, it is probable that the paint, as colored later from a new supply of tubes, would not match the first paint made because the pigments in different batches of tubes are subject to variation. Further, different sized tubes are used for pints, quarts or gallons of paint as it is more practical to handle the pigments in the largest possible tubes. Thus, for example, it is desirable that larger tubes be used for adding color to gallons of paint rather than using a multiple number of the size of tubes used for coloring pints. In addition, to achieve some colors, two or three different pigments from two or three different tubes are required. This further increases the number of tubes required to be kept in stock.

Other disadvantages in regard to tubes is that they are costly to fill and the time required to empty them properly is excessive. Moreover, there is always some pigment remaining in a so-called empty tube and if the amount undischarged from one tube varies sufficiently with that in another in mixing the same color in different cans, there is likely to be a color variation in the paint in respective cans.

To attempt to overcome the problems thus presented by the tube method of inserting pigments into the paint, there have been several elaborate, electronically operated devices proposed for discharging the required measured pigments into a white paint base to obtain the desired colors. These electronically operated devices are extremely expensive and are impractical for the average paint store. In addition, they have been found sufficiently unreliable so as to cause considerable consternation on the part of the user. If one should fail to operate properly, for example, on a Saturday morning when the paint store is crowded with people who are waiting to buy paint to take home, the result is disastrous.

Generally, the invention consists of a plurality of reservoirs or storage tanks removably secured to arms extending radially outward from a rotatable hub. Each of the reservoirs has its own measuring means from which the proper amount of a paint pigment may be discharged into a can of white base paint, for example. The device is designed to accurately measure and discharge colors or any combination of colors needed to give a final color or shade desired. Each of the reservoirs may contain a different basic color material.

In the reservoirs, the finely ground pigments are typically evenly dispersed in an oil or varnish vehicle containing volatile liquids. Because of the volatile liquids, it is necessary that no air come in contact with the individual mixtures and that evaporation of the volatiles be prevented in order to maintain the same viscosity no matter how long a basic color material is kept in a reservoir. Thus, each individual reservoir and its individual measuring means are adequately sealed to prevent the entry of air.

Another problem presented in the storage of pigments is that the heavier ones tend to settle out. To maintain an even dispersion of heavier pigments in a vehicle, the device according to the present invention is slowly and continuously rotated at a speed on the order of 5 r.p.m. except during short periods when the device is stopped to reload one of the reservoirs or to measure and discharge a color from one of them.

There is also provided a simple indexing means by which any individual reservoir may be stopped vertically above a stand for supporting paint cans so that from a particular reservoir and its measuring means a proper amount of the color may be discharged into the can below.

Provision is also made for a liquid level indicator to show when the level of the liquid in any of the reservoirs has dropped to a point where refilling is required.

It is, therefore, an object of the present invention to provide an improved pigment measuring and dispensing device.

It is a principal object of the present invention to provide an improved and simplified paint pigment measuring and dispensing device which is more economical, both in manufacture and use, and which is more reliable due to its simplicity than those in the prior art.

With these and other objects in view, this invention consists in the construction, arrangement and combination of the various parts of the measuring and dispensing device, whereby objects contemplated are attained as hereinafter more fully set forth, pointed out in the claims and illustrated in the accompanying drawings, wherein:

FIG. 3 is a side elevational view of the invention taken along the line 3—3 in FIG. 1;

FIG. 4 is a cross-sectional view of a typical reservoir and its measuring means taken along the line 4—4 in FIG. 1;

FIG. 5 is a fragmentary cross-sectional view of a reservoir measuring means in the discharging position;

FIG. 6 is a cross-sectional fragmentary view of the indexing device taken along the line 6—6 in FIG. 3, but with the device in position for operation;

FIG. 7 is a fragmentary cross-sectional view of the indexing device in operation;

FIG. 8 is a fragmentary elevational view of a second type of measuring means for a reservoir;

FIG. 9 is an elevational view taken along the line 9—9 in FIG. 8; and

FIG. 10 is a cross-sectional fragmentary view showing the key and groove relationship in the measuring means shown in FIG. 8.

Figure 1:
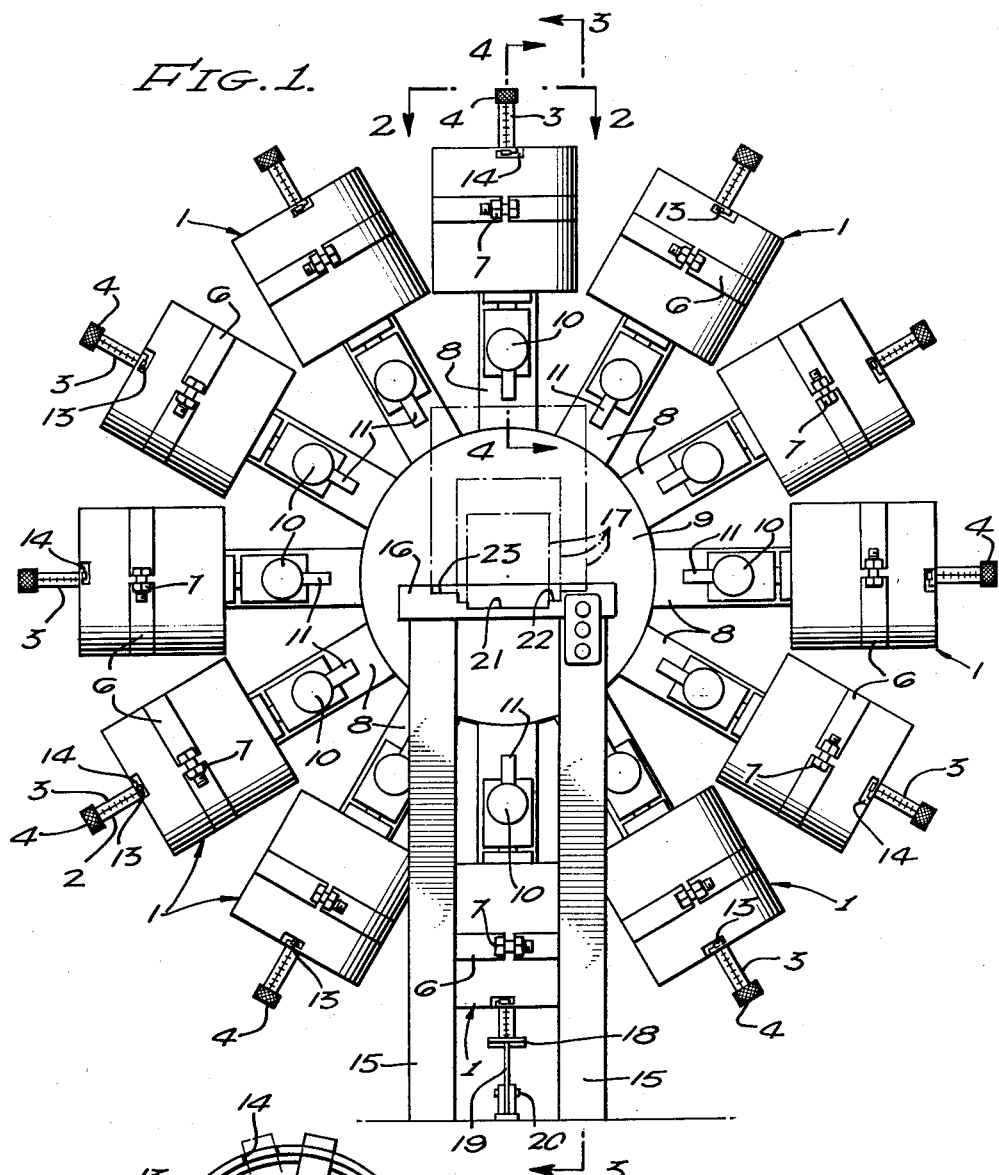
FIG. 1 is a front elevational view of the invention.
Figure 2:
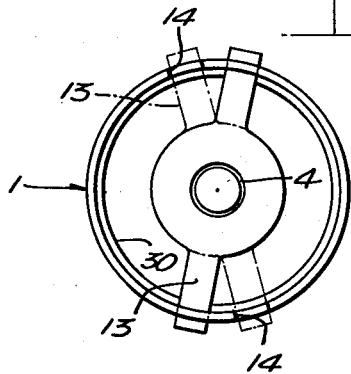
FIG. 2 is a plan view of the top of a reservoir taken along the line 2—2 in FIG. 1.

Referring to FIGS. 1-3, the assembled measuring and dispensing device shown has reservoirs or storage tanks 1 removably secured to radial arms 8 by bands 6. Bands 6 may be typically secured by a nut and bolt assembly 7 and arms 8 are secured to a rotatably mounted hub or wheel 9. The entire assembly is supported by a vertical frame means 27 in which axle 24 is mounted, hub 9 being supported by and secured for rotation to the latter. Vertical frame 27 may be secured at its base to a horizontal frame not shown in detail.

Reversible motor 29, also secured to a horizontal frame, drives reduction gear 28 which, in turn, drives pulley 26. Pulley 26, by means of belt 25, drives hub 9 so that the reservoirs continuously rotate about the axis of hub 9.

Vertical frame members 15 support horizontal frame portion 16 on which a paint can 17 may be supported so as to receive pigment from a reservoir stopped directly above it. To accommodate the paint cans of the typical pint, quart or gallon size, frame 16 has recessed portions 21, 22 and 23, respectively.

Motor 29 may be manually started and stopped by a 3-way reverse, off/on switch as indicated in FIG. 3. To stop one of the reservoirs directly above a paint can 17 on frame 16, an indexing means is provided. The indexing means assembly is shown in FIG. 3 and is operated by depressing foot pedal 18 so that lever 19 on fulcrum 20 raises roller 80 so that a substantially semicircular surface 81 on any of the ends of arms 8 will depress roller 80 and thereby break the power supply circuit to motor 29 within housing 82 of the indexing means. Leads 95 are shown disconnected but form a part of the power supply circuit to motor 29. In FIGS. 6 and 7, the indexing means is shown in detail. The view shown in FIG. 6 occurs when foot pedal 18 has been depressed and lever 19 has raised switch box 87 which is one of two slidable members typically in contact with walls of housing 82. Within box 87, conductive spring contacts 92 are shown completing the circuit in FIG. 6 by being in contact with the switch conductor portion 91 which is in its normal operating position held upward by spring 93 extending between conductor 91 and the dielectric threaded plug 94 forming the bottom of box 87. Upwardly on conductor 91 is dielectric pin 90 which, in turn, is integral with small diameter dielectric pin 89 slidably engaged in an opening in the dielectric upper portion of housing 87.

Extending transversely from housing 87 are dielectric sleeves 96 which are slidably engaged in vertical slots 88 of indexing housing 82. Sleeves 96 have been moved to their upper positions in slots 88 by the depression of pedal 18. Extending through sleeves 88 are bolt conductors 97 which are connected at one end to spring contacts 92 and at the other end to leads 95 which form a part of the power supply circuit to motor 29. When the foot pedal 18 is not depressed, switch box 87 is in every particular the same as in FIG. 6 except that it is lower in indexing housing 82 so that sleeves 96 rest at the bottom of slots 88.

Within the upper portion of indexing housing 82 is a second slidably engaged member 84 on which roller 80 is mounted on shaft 83. Extending downwardly from member 84 is a dielectric pin 85 which is held normally spaced from pin 89, extending from box 87, by spring 86; that is, spring 86 is strong enough to maintain the relative non-contacting positions of pins 85 and 89 when member 87 and member 84 are moved upward by lever 19, finger member 84 being moved concurrently with box 87 by spring 86.

Thus, in FIG. 6, as hub 9 rotates, the substantially semicircular surface 81 and arm 8 are about to make contact with roller 80 so that it will depress roller 80 as shown in FIG. 7. When this occurs, finger 84 is moved downwardly against the force of spring 86 and pin 85 contacts dielectric pin 89, moving switch conductor 91 out of contact with springs 92 so as to break the power supply circuit to motor 29. The circuit will then remain broken as long as foot pedal 18 is depressed so as to hold box 87 in its upper position. When it is desired to again start rotation of the reservoirs, and the measuring and dispensing operation or reloading has been completed, foot pedal 18 is no longer depressed and box 87 will move downwardly so that sleeves 96 are in their lower position in slots 88. This will restore pins 85 and 89 to their normal spaced relationship and spring 93 in housing 87 will force conductor 91 back into contact with spring clips 92 so that the circuit will again be closed and the reservoirs will start to rotate as driven by motor 29.

In FIG. 4, one of the reservoirs 1 is shown in cross-sectional detail. Each of said reservoirs has a main container portion 1a in the upper part thereof and a measuring and discharge portion formed in block 45 in the lower part thereof. The upper portion 1a may be a typically open-ended cylindrically-shaped container fitted with an elastomeric sealing cup 32 inserted in said one end. The other or lower end of container 1a has a discharge outlet 35. Liquid is shown to be in space 34, said liquid being bounded on the bottom and sides by the interior surfaces of the main container 1a and on the upper portion by sealing surface 32a, except for that part extending into passage 3a of air discharge tube 3. Neck 33, extending upwardly from seal cup 32, may be typically bonded to the external surface of tube 3 to form a seal around the latter. On the top of elastomeric cup 32 there may be a metallic cup or piston 30 to form a pressure surface for the lower part of spring 31 and to hold tube 3 in a vertical position. The upper part of spring 31 exerts a pressure against spring retainer 13, shown in plan FIG. 2, which is held in container 1a in the upper inner surface of slots 14 as shown in FIG. 1. Thus, to remove seal 32 from the reservoir, it is only necessary to rotate retainer 13 through a small arc, as indicated in FIG. 2, to the position shown in broken lines from which it can be lifted from the container.

After container 1a has been filled to a proper level with a color-forming material, for example, the seal 32 and tube 3, with cap 4 and seal 5 removed, is inserted therein so that the inner cup surface 32a will contact the upper part of the liquid. Piston 30 is inserted on top of seal 32. Then tube 3, piston 30 and cup 32 are pushed downward into container 1a until the liquid reaches the top of passage 3a in tube 3. At this time, all of the air has been removed from the liquid space 34 in container 1a. Seal 5 and cap 4 are then secured on the top of tube 3 and the spring 31 is compressed against the upper horizontal surface of piston 30 and the lower surface of spring-retainer 13 after the latter has been inserted into grooves 14, as indicated in FIG. 1. The spring 31 then exerts pressure against retainer 13, piston 30 and cup 32 so that surface 32a of the latter will remain in contact with the upper surface of the liquid in space 34 until cup 32 is forced to the bottom of container 1a which will then have to be refilled.

Liquid level indicator markings may be cut into the external surface of tube 3 so that each reservoir may be refilled at a proper time before it becomes empty; that is, when the tube 3 is lowered into reservoir 1 as fluid is discharged therefrom, at a certain mark thereon relative to the top of reservoir 1, the latter should be refilled.

At the lower part of FIG. 4, one embodiment of the measuring means is shown. Discharge outlet 35 of container 1a is self-sealing by means of sealing ball 36 held in its seat in the lower end of the outlet by spring 37. When ball 36 is removed from its seat, outlet 35 is in communication with measuring chamber 38 by means of inlet 39. Measuring chamber 38 has a self-sealing outlet 40, said sealing means being formed by a ball 41 held in its seat on the bottom of outlet 40 by spring 42. At the lower end of block 45 is cap 43 against which the lower end of spring 42 abuts. Cap 43 has a discharge orifice 43a through which the measured liquid is finally discharged out of the measuring chamber 38. Under cap 43 is orifice seal 44, made typically of an elastomeric material, to prevent air from entering orifice 43a when the measuring means is not discharging. Seal 44 prevents the clogging of orifice 43a which would result by the drying of the color material therein if it were open to the air.

Within measuring chamber 38 is a rubber cup 48 which extends transversely within the chamber so as to form a seal around the cup in contact with the inner periphery of the chamber. Outwardly from cup 48, and attached thereto, is piston 49 connected to a piston rod 56 which extends outwardly from block 45. Cut into piston 49 is a groove in which an O-ring 50 is inserted to form a seal with the interior surface or surfaces of chamber 38. Secured to block 45 is a plate 46 which retains cup 48 and piston 49 within chamber 38. Air vent 77 extends through plate 46 so as to allow air to be discharged from the externally-directed side of piston 49 when it is moved to the right in the drawing. Externally-threaded stem or sleeve 51, in which piston rod 56 is slidably engaged, extends outwardly from plate 46. Threadedly engaged with the threads on sleeve 51 is a micrometer-type nut 52 having typical micrometer markings 53 on the beveled end thereof. Barrel 55 may be press fit on sleeve 51 outwardly of the threaded portion. On barrel 55 are micrometer markings 54 which are adapted to be used in conjunction with those on nut 52 when the latter is rotated on barrel 55.

Adjacent the outward end of piston rod 56 is a small diameter portion 58. Secured to the outer end of the small diameter portion is a head which may be formed by a nut or screw 59. Slidably engaged on small diameter portion 58 is knob 10. Knob 10 may be generally cylindrical and on its outer end has a recessed portion 60 in which nut 59 is slidable. Within knob 10 is an enlarged diameter recessed portion 61, the surface of which is slidably engaged with the outer surface of barrel 55. In recess 61 is spring 57, one end of which abuts the barrel 55 and the other end abuts surface 61a, forming the inner base of recess 61. Spring 57 holds piston rod 56, piston 49 and cup 48 in a non-discharging position during which time measuring chamber 38 would normally be fully loaded.

Attached to knob 10 is arm 11 to which cap seal 44 is attached. Arm 11 has a slot 12 which is adapted to slide over a guide pin 47 so as to hold the seal 44 in proper alignment with orifice 43a. As may be seen, spring 57 holds seal 44 on orifice 43a in the same manner as it holds cup 48 in the non-discharging position.

When knob 10 is pushed to the left in FIG. 4, it may be moved the distance between surface 62 on rod 56 and surface 61a in recess 61 without moving cup 48 and piston 49, but this movement moves seal 44 away from orifice 43a so as to allow a discharge therefrom. Thus, after surface 61a contacts surface 62, continual movement of knob 10 will move piston 49 and cup 48 through the measuring chamber 38 so as to discharge fluid therein by holding ball 36 in its upper sealing position and unseating ball 41 so as to discharge fluid through outlet 40 in orifice 43a. Knob 10 may be moved to the left, as indicated in FIG. 5, until surface 63 makes contact with micrometer nut 52, which thus limits the movement of the piston and the amount of discharge from the measuring chamber in accordance with the micrometer setting nut 52 on barrel 55.

To fill measuring chamber 38, which may be typically cylindrical with its longitudinal axis in the direction of rod 56, nut 52 is turned clockwise to the end of its travel on threads 51 to provide the maximum stroke for piston 49 and cup 48. By pushing knob 10 so as to move cup 48 longitudinally to the left base of cylindrical mixing chamber 38, cup 48 and piston 49 will act as a pump so as to force air out of chamber 38 through outlet 40 and orifice 43a and to draw fluid into chamber 38 through passages 35 and 39 by the creation of a vacuum within chamber 38. By several reciprocating movements of the pump, formed by cup 48 and piston 49, chamber 38 will be completely filled with liquid. The reservoirs are then ready for the measuring operation. Micrometer nut 52 must be set in relation to barrel 55 as desired so that the proper amount of liquid will be discharged from chamber 38 when knob 10 is moved to contact nut 52.

In FIGS. 8, 9 and 10, another type of measuring setting means is illustrated. The measuring chamber 38 is in a block 45 and seal 44, arm 11, rod 56 and knob 10 have the same structure as the same parts shown in FIGS. 4 and 5. Here, barrel 64 replaces barrel 55 and is secured to plate 76 which closes block 45 and measuring chamber 38. Piston rod 56 is slidably engaged in barrel 64 in the same manner as in barrel 55 but for a longer distance.

Dial knob 66 is mounted for rotation on the exterior of barrel 64 inwardly of knob 10 and has a small diameter portion 67 which also surrounds barrel 64. On the exterior surface of barrel 64 is a generally spirally-directed groove 65 of V-shaped cross section. Extending radially inwardly from the small diameter portion 67 of dial knob 66 is a V-shaped key 68 which is engaged in V-shaped groove 65. Key 68 extends from set screw 68a which is threadedly engaged in portion 67 and locking set screw 69 is employed to hold screw 68a in place and thereby hold V-shaped key 68 snugly in groove 65.

The length of the stroke of the piston 49 and rod 56 depends on the position of knob 66 on barrel 64 and thus, in order to change it, dial knob 66 is rotated in one direction or the other, toward or away from plate 76, depending on whether an increase or decrease in the amount of discharge of fluid from chamber 38 is desired. In FIG. 9, the face of the dial on knob 66 is shown with an indicator 70 at the top and numbers 71 thereon for use when, for example, the measuring chamber 38 would be designed to hold and discharge 30 cubic centimeters on one full stroke of the piston. Thus, a rotation of the dial 66 from one number to the next, for example, from 1 to 2, would change the amount of measured discharge from 1 cubic centimeter to 2 cubic centimeters. In FIG. 8, the measuring setting is aproximately such that there would be no discharge and thus in FIG. 9, the dial reads zero.

Indicator 70 is secured to a rod 73 which is slidably engaged in a sleeve or tube 75 in which there is a spring 74 which biases rod 73 so that ball-bearing 72 is always in bearing contact with the back face of dial knob 66. This bearing contact holds the indicator 70 in a steady position and allows the dial knob 66, when rotated, to move indicator 70 along with it in the longitudinal direction.

In operation, reservoirs 1 are continually rotated at a slow r.p.m. to keep the paint pigments in each reservoir in a homogeneous state. To stop the rotation of any one of the reservoirs in order to discharge from any of them, foot pedal 18 is depressed so that roller 80 on the indexing means will contact a surface 81 on an arm diametrically opposite the arm on which the reservoir from which pigment is to be discharged is attached. When the reservoir is so stopped above a paint can 17, the micrometer nut 52 or the dial knob 66 is moved to the correct predetermined position so that the piston, when moved by knob 10, will travel a predetermined distance longitudinally in chamber 38 so as to discharge the required amount of pigment to give the color desired. The amount of pigment to give a final color to a white base paint, of course, must be predetermined and, preferably, by the paint manufacturer. Paint formulas are usually stated in the metric system and it would, thus, be desirable that the bore of cylindrical chamber 38 and the stroke of piston 49 therein be predetermined so that one revolution of the micrometer nut, for example, would permit the piston 49 to travel the exact distance to eject from orifice 43a one cubic centimeter of the coloring material. In such a case, the threads 51 on which micrometer nut 52 rotates, in FIGS. 4 and 5, would determine the number of cubic centimeters ejected with each stroke of piston 49. Graduations on the micrometer nut 52 should be arranged so that each would indicate a fraction of a cubic centimeter and those on barrel 55 would be set, for example, to have each represent one cubic centimeter. For easy operation, fractions on the nut could be indicated in numbers and the markings on the barrel could be indicated by letters, so that the operator could refer to a chart, provided by the paint company, indicating the specific setting for each color and can size, without any calculation.

In case a greater quantity of color pigment is needed for a certain size can, for example, a gallon can, than would be provided by one full stroke of the piston, the amount required could be coded on the chart to so indicate the number of full strokes and the length of the partial stroke.

As soon as the proper amount of pigment has been discharged, the operator then can release foot pedal 18 and the circuit will be again completed to motor 29 so that reservoirs 1 will be again rotated. After the pigment has been added to the individual cans of paint, they can be mixed by the usual hand mixing or mechanical agitating methods.

In the event that more reservoirs are required than the device will hold for the possible desirable color combinations, additional reservoirs containing pigments can be stored in racks. When so stored the heavier materials will settle to the bottom and mixing is required before the pigments can be used to color a white base paint. To achieve this mixing rapidly, the mechanical agitators now available in paint stores can be used. These agitators can also be used to mix the material in the reservoirs on the device if it has been stopped for a long period.

Of course, in order to add a reservoir containing another pigment to the machine, one of the reservoirs will have to be removed from one of the arms. After the materials in the reservoirs have been properly mixed, the slow, continuous rotation provided by the invention will keep the materials in a homogeneous state.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. In a dispensing device, a plurality of liquid carrying reservoirs spaced circumferentially around a hub; each of said reservoirs being removably secured to arms extending radially outwardly from said hub; an electric motor to rotate said reservoirs and said hub about its axis; frame means having a supporting surface centrally located with respect to said reservoirs to support a receiving container; each of said reservoirs comprising a generally cylindrical main container with one end open; sealing means adapted to close and seal said one end; said sealing means being spring biased inwardly to remain in contact with liquid in said container; means to indicate the amount of liquid in said container extending outwardly on said sealing means and from said one end; a liquid measuring chamber adjoining said main container adjacent its end opposite said open end; a main container outlet at said opposite end in communication with an inlet on said measuring chamber; said last-mentioned inlet being adjacent one end of said chamber; a discharge outlet on said measuring chamber adjacent said one end thereof; a piston fitted in said chamber movable the substantial length of said chamber toward said one end to discharge liquid therefrom; said piston forming a seal with the interior periphery of said chamber transverse to the direction of movement of said piston; self-sealing means on said main container outlet to prevent the flow of liquid therethrough when said piston is moved from a non-discharging position adjacent an end opposite said one end of said chamber towards said one end thereof; self-sealing means on said measuring chamber discharge outlet to prevent flow therethrough when said piston is moved in a direction towards said non-discharging position; said piston having actuating means extending externally of said measuring chamber; means externally of said measuring chamber to limit movement of said actuating means externally of said measuring chamber and of said piston within said measuring chamber; a second seal on said measuring chamber discharge outlet externally thereof; means connected to said piston actuating means to remove said second seal from said measuring chamber discharge outlet when said piston is moved to discharge liquid therefrom; biasing means to return the piston to its non-discharging position and said second seal to its sealing position; each of said arms having a substantially semicircular surface on its outwardly extending end; indexing means to stop the rotation of said reservoirs about said axis so that any one of said reservoirs may be stopped in a position directly above said frame means; said indexing means comprising an elongated housing containing two members spring biased longitudinally so as to be spaced from each other and slidably engaged in said housing; one of said members having one end thereof extending outwardly from said housing; said one member having a roller adapted for rotation extending beyond said one end; a lever connected to move said members in said housing in said spaced spring-biased relationship so that said one member will be extended away from said housing towards said hub so that said roller will be moved into the rotational path of said semicircular surfaces on said arms; the other of said members having a spring-biased switch means therein and forming a part of said electric motor's power supply circuit; and a dielectric pin connected to said switch means and having one end thereof extending from said other member towards said one member; said dielectric pin being slidably engaged in said other member so that when one of said surfaces on one of said arms contacts said roller in its extended position, said one member will contact said one end of said pin and thereby slidably move said pin and said switch means to break said circuit.

2. In combination for use in a liquid dispensing device, a main container having one open end; a sealing means fitted for sealing said one end thereof biased to remain in contact with the liquid in said container; means on said sealing means to indicate the amount of liquid in said container; a liquid measuring means adjoining said main container adjacent an end opposite said one end; a main container outlet at the opposite end of said main container in communication with said measuring means to supply liquid from said main container to said measuring means; a discharge outlet on said measuring means; means to discharge a predetermined measured amount of liquid from said measuring means; self-sealing means on said main container outlet to prevent the flow of liquid through said last-mentioned outlet when said predetermined amount of liquid is being discharged from said measuring means; and means to prevent the discharge of said liquid from said measuring means when said measuring means is being supplied with liquid from said main container.

3. In combination for use in a dispensing device a main container; a sealing means adapted to seal one end thereof extending substantially over the area forming said one end and being substantially within said container, said sealing means being spring biased to remain in contact with the liquid in said container; means to indicate the amount of liquid in said container extending outwardly on said sealing means and from said one end; a liquid measuring means adjoining said main container adjacent its other end; a main container outlet at the other end thereof in communication with an inlet on said measuring means to supply liquid from said main container to said measuring means; a discharge outlet on said measuring means; a measuring chamber in said measuring means; a piston fitted in said chamber movable the substantial length of said chamber and forming a seal with the interior periphery of said chamber transverse to the direction of the movement of said piston; self-sealing means on said main container outlet to prevent the flow of liquid through said last-mentioned outlet when said piston is moved from a non-discharge position so as to discharge liquid from said measuring chamber; self-sealing means on said measuring means discharge outlet to prevent flow therethrough when said piston is moved in the direction opposite to that of the discharge direction; said piston having actuating means extending externally of said measuring chamber; means externally of said measuring chamber to limit the movement of said actuating means externally of said measuring chamber and of said piston within said measuring chamber; a second seal on said measuring means discharge outlet externally thereof; means connected to said piston-actuating means to remove said second seal from said measuring means discharge outlet when said piston is moved to discharge liquid from said measuring chamber; and biasing means to return the piston to its non-discharge position and said second seal to its sealing position.

4. The invention according to claim 3 in which said piston actuating means includes a piston rod having one end thereof connected to said piston and having the other end thereof extending externally of said measuring chamber, a knob on the other end of said rod; said rod extending within a sleeve externally of said chamber; said sleeve having external threads; and in which said means externally of said measuring chamber to limit said actuating means includes a micrometer-type nut threadedly engaged on said sleeve; said sleeve having an indicator thereon generally outwardly of said nut with markings corresponding to the position of said micrometer nut so that the position of said micrometer nut and said markings indicate the amount of liquid to be discharged from said measuring chamber when said knob is moved so as to move said piston within said measuring chamber until said knob contacts said nut.

5. The invention according to claim 3 in which said piston-actuating means includes a piston rod connected at one end thereof to said piston and extending outwardly from said chamber; a knob on the other end of said piston rod; said rod being engaged to move with said knob; said piston rod extending through and externally of a barrel secured to the exterior of said measuring chamber; said knob and said rod being slidably engaged with said barrel; an indicating disc rotatable on said barrel between said measuring chamber and said knob; said disc having a V-shaped key extending inwardly therefrom into a V-shaped groove in the external surface of said barrel; said V-shaped groove extending longitudinally on said barrel to form an approximate helix; said disc forming a limit stop for the movement of said knob on said barrel and said piston in said measuring chamber so as to limit the amount of discharge of liquid from said measuring chamber; indicating markings on said disc so as to indicate the amount of liquid to be discharged from said measuring chamber when said knob is moved on said barrel so as to be limited in its movement by said disc.

6. In combination for use in a dispensing device, a main container; means for sealing one end of said main container, said sealing means comprising an inwardly opening elastomeric cup adapted to extend substantially over the area adjacent said one end of said main container and forming a seal around the inner periphery of said main container transverse to the axis of said cup; said sealing means having a tube extending therein and having one end of said tube open to said container, the other end of said tube extending outwardly from said container and having a removable sealing closure thereon; said sealing means being spring biased to remain in contact with the liquid in said container; markings on the exterior of said tube to indicate the amount of liquid in said container; a generally cylindrical liquid measuring chamber connected to said main container adjacent its other end; a main container outlet at the other end thereof connected so as to be in communication with an inlet of said measuring chamber to supply liquid from said main container to said measuring chamber; a discharge outlet on said measuring chamber adjacent one end thereof; a piston slidably engaged in said chamber movable the substantial length thereof in the direction along the cylindrical axis thereof and forming a seal with the interior periphery of said chamber transverse to said axis; said piston being fitted to discharge liquid from said chamber through said discharge outlet when moved towards said one end of said chamber; releasable self-sealing means on said main container outlet to prevent the flow of liquid through said last-mentioned outlet when said piston is moved to discharge liquid from said measuring chamber; releasable self-sealing means on said measuring chamber discharge outlet to prevent the flow of liquid therethrough when said piston is moved in the direction opposite to that direction in which it is moved to discharge; a piston rod connected at one end thereof to said piston and extending outwardly from said chamber; a knob on the other end of said piston rod; said rod being engaged to move with said knob; said piston rod extending through and externally of a sleeve member secured to the exterior of said measuring chamber; said sleeve having threads on an external portion thereof adjacent said chamber and one end thereof; a barrel extending outwardly from said sleeve on said piston rod and having one end thereof in engagement with a portion of said sleeve adjacent the other end thereof; a micrometer nut threadedly engaged with said threads on said sleeve; said knob being slidable over the exterior of said barrel; said micrometer nut being adapted to limit the sliding movement of said knob on said barrel and said piston within said measuring chamber; measuring indicator markings on said micrometer nut and on said barrel to indicate the amount of fluid being measured and discharged from said measuring chamber when said knob is moved so as to be limited by the position of said micrometer nut; a second seal on said measuring chamber discharge outlet externally thereof; means connected to said knob and said second seal to move said second seal from said last-mentioned outlet when said piston is moved to discharge fluid from said measuring chamber; and biasing means to return said piston to a non-discharge position adjacent said other end of said chamber and said second seal to its sealing position.

7. In combination for use in a dispensing device a main container having a substantially open end; means for sealing said open end of said container; said sealing means comprising an inwardly opening elastomeric cup adapted to extend substantially over the area formed by said open end and forming a seal around the inner periphery of said main container transverse to the axis of said cup so as to close said open end, said sealing means being slidable within said container; said sealing means having a tube extending therein and having one end of said tube open to said container; the other end of said tube extending outwardly from said container and having a removable sealing closure thereon; said sealing means being spring biased to remain in contact with the liquid in said container; markings on the exterior of said tube to indicate the amount of liquid in said container; a generally cylindrical liquid measuring chamber connected to said main container adjacent its end opposite said open end; a main container outlet at said opposite end connected so as to be in communication with an inlet of said measuring chamber to supply liquid from said main container to said measuring chamber; a discharge outlet on said measuring chamber adjacent one end thereof; a piston slidably engaged in said chamber movable the substantial length thereof in the direction along the cylindrical axis thereof forming a seal with the inner periphery of said chamber transverse to said axis; said piston being fitted to discharge liquid from said chamber through said discharge outlet when moved towards said one end of said chamber; releasable self-sealing means on said main container outlet to prevent the flow of liquid through said last-mentioned outlet when said piston is moved to discharge liquid from said measuring chamber; releasable self-sealing means on said measuring chamber discharge outlet to prevent the flow of fluid therethrough when said piston is moved in a direction opposite to that in which it is moved to discharge; a piston rod connected at one end thereof to said piston and extending outwardly from said chamber; a knob on the other end of said piston rod; said rod being engaged to move with said knob; said piston rod extending through and externally of a barrel secured to the exterior of said measuring chamber; said knob and said rod being slidably engaged with said barrel; a second seal on said measuring chamber discharge outlet externally thereof; means connected to said knob and said second seal to move said second seal from said last-mentioned outlet when said piston is moved to discharge fluid from said measuring chamber; spring-biasing means within said knob and surrounding said rod so as to turn said piston to a non-discharge position adjacent said other end of said chamber, said second seal to its sealing position and to hold said piston in a non-discharge position; an indicating disc rotatable on said barrel between said measuring chamber and said knob; said disc having a V-shaped key extending inwardly therefrom into a V-shaped groove in the external surface of said barrel; said V-shaped groove extending longitudinally on said barrel to form an approximate helix; said disc forming a limit means for the movement of said knob on said barrel and said piston in said measuring chamber so as to limit the amount of discharge of liquid from said measuring chamber; indicating markings on said disc so as to indicate the amount of liquid discharge from said measuring chamber when said knob is moved on said barrel so as to be limited in its movement by said disc.

8. An indexing means for stopping an electrically driven rotatable device at a predetermined position comprising: an elongated housing containing two spring-biased members so as to be spaced longitudinally from each other and slidably engaged in said housing; one of said members having one end thereof extending outwardly from said housing; said last-mentioned one end having a contacting means extending beyond said one end of said one member; a lever connected to move said members in said housing in said spring-biased relationship so that said one member will be extended away from said housing; said other member having a spring-biased switch means thereon and forming a part of an electric circuit supplying power to rotate said device; a dielectric pin having one end thereof extending from said other member towards said one member; said dielectric pin being slidably engaged in said other member and having said switch means connected to the other end thereof so that when said contacting means is moved towards said other member, said one member will contact said one end of said pin and thereby slidably move said pin and said switch means to break said circuit.

9. An indexing means for stopping an electrically driven rotatable device at a predetermined position comprising: an elongating housing containing two members spring biased longitudinally so as to be spaced from each other; said members slidably engaged in said housing; one of said members having one end thereof extending outwardly from said housing; said last-mentioned one end having a roller adapted for rotation thereon and extending beyond said one end of said one member; said other member having a switch means therein forming a part of an electric circuit to supply power to rotate said device; said switch means being spring biased in the direction towards said one member and having a dielectric pin secured thereto; said switch means being held between inwardly directed ends of two spaced conductive spring clips when effectively spring biased towards said one member; the other end of one clip secured to one side of said other member and the other end of the other clip secured to an opposite side of said one side in said other member; said pin extending through an opening in said other member towards said one member; said pin being slidably engaged in said opening; one electrical lead in said power supply circuit extending from each of said other ends of said clips on each corresponding opposite side of said other member through a corresponding slot in each corresponding opposite side of said housing; said slots being longitudinally aligned; said leads and said other member being movable longitudinally the extent of said slots in said housing; a lever connected to move said other member towards said one member while both of said members are in said spring-biased relationship so that said one member and said roller will be extended away from said housing whereby when said roller is moved from its extended position towards said one member, said one member will contact said dielectric pin, causing it to move said switch means out of contact with said clips and said circuit will be broken.

10. In a dispensing device, a plurality of liquid carrying reservoirs spaced circumferentially around a predetermined axis of a centrally located hub; each of said reservoirs being removably secured to arms extending radially outward from said hub; each of said arms being diametrically opposite another of said arms; an electric motor to rotate said hub and said reservoirs; frame means centrally located with respect to said reservoirs to support a receiving container; each of said reservoirs comprising a main container of a generally cylindrical shape and having an open end; means for sealing said open end comprising an inwardly opening elastomeric cup adapted to close said open end and to have its periphery slidably engaged on the cylindrical wall of said container and forming a seal therewith; the axis of said cup being substantially coincident with the cylindrical axis of said container; said sealing means having a tube extending therein and having one end of said tube open to said container; the other end of said tube extending outwardly from said container and having a removable sealing closure thereon; said sealing means being spring biased inwardly to remain in contact with the fluid in said container; markings on the exterior of said tube to indicate the amount of liquid in said container with respect to its position in relation to said open end of said container; a generally cylindrical liquid measuring chamber connected to said main container adjacent its end opposite said open end; a main container outlet at said opposite end thereof connected so as to be in communication with an inlet of said measuring chamber to supply fluid from said main container to said measuring chamber; said inlet to said measuring chamber being adjacent one end thereof; a discharge outlet on said measuring chamber adjacent said one end thereof; a piston slidably engaged in said measuring chamber movable the substantial length thereof in a direction along the cylindrical axis thereof and forming a seal with the interior periphery of the cylindrical wall of said tube; said piston being fitted to discharge liquid from said chamber through said discharge outlet when moved towards said one end of said chamber; a releasable self-sealing means on said main container outlet to prevent the flow of fluid through said last-mentioned outlet when said piston is moved to discharge liquid from said measuring chamber; releasable self-sealing means on said measuring chamber discharge outlet to prevent flow therethrough when said piston is moved in a direction opposite to that in which it is moved to discharge; a piston rod connected at one end thereof to said piston and extending outwardly from said chamber in a direction opposite said discharging direction; a knob on the other end of said piston rod; said rod being engaged to move with said knob; said piston rod extending through and externally of a sleeve member secured to the exterior of said measuring chamber; said sleeve having external threads on one end thereof adjacent said chamber; a barrel extending outwardly from said sleeve adjacent its other end and on said piston rod; said rod being slidable in said sleeve and said barrel; a micrometer nut threadedly engaged with said threads on said sleeve; said knob being slidable over the exterior of said barrel; said micrometer nut being adapted to limit the sliding movement of said knob on said barrel and to limit the movement of said piston within said measuring chamber; measuring indicating markings on said micrometer nut and complementary markings on said barrel to indicate the amount of liquid being measured and discharged from said measuring chamber when said knob is moved in said discharge direction so as to be limited by the position of said micrometer nut on said barrel; a second seal on said measuring chamber discharge outlet externally thereof; means connected to said knob and said second seal to move said second seal from said last-mentioned outlet when said piston is moved to discharge fluid from said measuring chamber; biasing means to return said piston to a non-discharge position adjacent said other end of said chamber and said second seal to its sealing position; each of said arms having a substantially semicircular surface on its outwardly extending end; indexing means for selecting a reservoir to discharge liquid into a receiving container on said frame means; said indexing means comprising an elongated housing containing two members spring biased longitudinally so as to be spaced from each other and slidably engaged in said housing; one of said members having one end thereof extending outwardly from said housing; said last-mentioned end having a roller adapted for rotation thereon and extending beyond said one end of said member; the axis of said roller being parallel to the axis of the said hub; the other of said members having a switch means therein forming part of the electrical power supply circuit of said motor; said switch means being spring biased in the direction towards said one member and having a dielectric pin secured thereto; said switch means being held between inwardly directed ends of two conductive spring clips when effectively spring biased towards said one member; said pin extending through an opening in said other member towards said one member; said pin being slidably engaged in said opening; each of said clips having an outwardly directed end secured to a corresponding opposite side of said other member; one electrical lead in said power supply circuit extending from each of said outwardly directed ends of said clips on each corresponding opposite side of said other member through a slot in each corresponding opposite side of said housing; said slots being longitudinally aligned; said leads and said other member being movable longitudinally the extent of said slots in said housing; a lever connected to move said other member towards said one member while both of said members are in said spaced spring-biased relationship so that said one member and said roller will be extended away from said housing towards said hub; said roller being in radial alignment outwardly from said arms whereby when said roller is extended away from said housing by the movement of said lever, it will be in the path of rotation of said surfaces on said arms and the semicircular surface of one of said rotating arms will contact said roller and push said one member towards said other member and thereby contact said dielectric pin and cause it to move said switch means out of contact with said clips so as to break said circuit and stop the rotation of said arms and said reservoirs so that the arm diametrically opposite said one contacting arm will stop vertically above said frame means.

11. In a dispensing device, a plurality of liquid carrying reservoirs spaced circumferentially around a predetermined axis of a centrally located hub; each of said reservoirs being removably secured to arms extending radially outward from said hub; each of said arms being diametrically opposite another of said arms; an electric motor to rotate said hub and said reservoirs; frame means centrally located with respect to said reservoirs to support a receiving container; each of said reservoirs comprising a main container of a generally cylindrical shape and having an open end; means for sealing said open end comprising an inwardly opening elastomeric cup adapted to close said open end and to have its periphery slidably engaged on the cylindrical wall of said container and forming a seal therewith; the axis of said cup being substantially coincident with the cylindrical axis of said container; said sealing means having a tube extending therein and having one end of said tube open to said container; the other end of said tube extending outwardly from said container and having a removable sealing closure thereon; said sealing means being spring biased inwardly to remain in contact with the fluid in said container; markings on the exterior of said tube to indicate the amount of liquid in said container with respect to its position in relation to said open end of said container; a generally cylindrical liquid measuring chamber connected to said main container adjacent its end opposite said open end; a main container outlet at said opposite end thereof connected so as to be in communication with an inlet of said measuring chamber to supply fluid from said main container to said measuring chamber; said inlet to said measuring chamber being adjacent one end thereof; a discharge outlet on said measuring chamber adjacent said one end thereof; a piston slidably engaged in said measuring chamber movable the substantial length thereof in a direction along the cylindrical axis thereof and forming a seal with the interior periphery of the cylindrical wall of said tube; said piston being fitted to discharge liquid from said chamber through said discharge outlet when moved towards said one end of said chamber; a releasable self-sealing means on said main container outlet to prevent the flow of fluid through said last-mentioned outlet when said piston is moved to discharge liquid from said measuring chamber; releasable self-sealing means on said measuring chamber discharge outlet to prevent flow therethrough when said piston is moved in a direction opposite to that in which it is moved to discharge; a piston rod connected at one end thereof to said piston and extending outwardly from said chamber in a direction opposite said discharging direction; a knob on the other end of said piston rod; said rod being engaged to move with said knob; said piston rod extending through and externally of a barrel secured to the exterior of said measuring chamber; said knob and said rod being slidably engaged with said barrel; a second seal on said measuring chamber discharge outlet externally thereof; means connected to said knob and said second seal to move said second seal from said last-mentioned outlet when said piston is moved to discharge fluid from said measuring chamber; spring-biasing means within said knob and surrounding said rod so as to return said piston to a non-discharge position adjacent said other end of said chamber, said second seal to its sealing position, and to hold said piston in a non-discharge position; an indicating disc rotatable on said barrel between said measuring chamber and said knob; said disc having a V-shaped key extending inwardly therefrom into a V-shaped groove in the external surface of said barrel; said V-shaped groove extending longitudinally on said barrel to form an approximate helix; said disc forming a limit means for the movement of said knob on said barrel and said piston in said measuring chamber so as to limit the amount of discharge of liquid from said measuring chamber; indicating markings on said disc so as to indicate the amount of liquid discharged from said measuring chamber when said knob is moved on said barrel so as to be limited in its movement by said disc; each of said arms having a substantially semicircular surface on its outwardly extending end; indexing means for selecting a reservoir to discharge liquid into a receiving container on said frame means; said indexing means comprising an elongated housing containing two members spring biased longitudinally so as to be spaced from each other and slidably engaged in said housing; one of said members having one end thereof extending outwardly from said housing; said last-mentioned end having a roller adapted for rotation thereon and extending beyond said one end of said member; the axis of said roller being parallel to the axis of the said hub; the other of said members having a switch means therein forming part of the electrical power supply circuit of said motor; said switch means being spring biased in the direction towards said one member and having a dielectric pin secured thereto; said switch means being held between inwardly directed ends of two spaced conductive spring clips when effectively spring biased towards said one member; the other end of one clip secured to one side of said other member and the other end of said other clip secured to a side opposite said one side in said other member; said pin extending through an opening in said other member towards said one member; said pin being slidably engaged in said opening; one electrical lead in said power supply circuit extending from each of said other ends of said clips on each corresponding opposite side of said other member through a corresponding slot in each corresponding opposite side of said housing; said slots being longitudinally aligned; said leads and said other member being movable longitudinally the extent of said slots in said housing; a lever connected to move said other member towards said one member while both of said members are in said spaced spring-biased relationship so that said one member and said roller will be extended away from said housing towards said hub; said roller being in radial alignment outwardly from said arms whereby when said roller is extended away from said housing by the movement of said lever, it will be in the path of rotation of said surfaces on said arms and the semicircular surface of one of said rotating arms will contact said roller and push said one member towards said other member and thereby contact said dielectric pin and cause it to move said switch means out of contact with said clips so as to break said circuit and stop the rotation of said arms and said reservoirs so that the arm diametrically opposite said one contacting arm will stop vertically above said frame means.

12. In a dispensing device, a plurality of fluid carrying reservoirs spaced circumferentially for rotation around a predetermined axis of a centrally located hub; frame means located with respect to said reservoirs for supporting a receiving container under any of said reservoirs when any of said reservoirs is rotated to a position above said container; each of said reservoirs being removably secured to arms extending radially outwardly from said hub; each of said arms having a convexly curved surface on its outwardly extending end; indexing means for stopping the rotation of said reservoirs about said axis so that any one of said reservoirs may be stopped in a position directly above said frame means for supporting said receiving container; said indexing means comprising an elongated housing containing two members spring-biased longitudinally from each other and slidably engaged in said housing; one of said members having one end thereof extending outwardly from said housing, said last-mentioned one end having a roller adapted for rotation and extending beyond said one end of said one member; a lever connected to move said members in said housing in said spring-biased relationship so that said one member will be extended away from said housing towards said hub so that said roller will be moved into the rotational path of said curved end surfaces on said arms; said other member having a spring-biased switch means therein and forming a part of said electric motor's power supply circuit; a dielectric pin having one end thereof extending from said other member towards said one member; said dielectric pin being slidably engaged in said other member and having said switch means connected to the other end thereof so that when one of said surfaces on one of said arms contacts said roller in its extended position, said one member will contact said one end of said pin and thereby slidably move said pin and said switch means to break said circuit.

13. In a dispensing device, a plurality of fluid carrying reservoirs spaced circumferentially around a predetermined axis of a centrally located hub; frame means centrally located with respect to said reservoirs for supporting a receiving container; each of said reservoirs being removably secured to arms extending radially outwardly from said hub; each of said arms having a substantially semi-circular surface on its outwardly extending end; each of said arms being diametrically opposite another of said arms; said indexing means comprising an elongated housing containing two members spring-biased longitudinally so as to be spaced from each other; said members slidably engaged in said housing; one of said members having one end thereof extending outwardly from said housing; said last-mentioned one end having a roller for rotation thereon and for extending beyond said one end of said one member; the axis of said roller being parallel to the axis of said hub; said other member having a switch means therein forming part of the electrical power supply circuit for said motor; said switch means being spring-biased in the direction towards said one member and having a dielectric pin secured thereto; said switch means being held between two conductive spring clips when effectively spring biased towards said one member; said pin extending through an opening in said other member towards said one member; said pin being slidably engaged in said opening; electrical leads in said power supply circuit extending from each of said clips to corresponding opposite sides of said housing through corresponding slots in said opposite sides of said housing so that said leads and said other member may be moved longitudinally the extent of said slots in said housing; a lever connected for moving said other members towards said one member while both of said members are in said spaced spring-biased relationship so that said one member and said roller will be extended away from said housing towards said hub; said roller being in radial alignment outwardly from said arms so that when said roller is extended away from said housing by the movement of said lever, it will be in the path of rotation of said surfaces on said arms and the semicircular surface on one of said arms will contact said roller and push said one member towards said other member and thereby contact said dielectric pin and cause it to move said switch means out of contact with said clips so as to break said circuit and stop the rotation of said arms and said reservoirs whereby the arm diametrically opposite said one contacting arm will stop directly above said frame means.

14. In combination for dispensing a plurality of different fluids, a plurality of reservoirs each constructed to hold a different one of the fluids in the plurality, means including a motor operatively associated with the different reservoirs in the plurality for obtaining a sequential movement of the different reservoirs in the plurality past a particular position, switching means disposed in a first position in decoupled relationship to the reservoirs in the plurality and movable to a second position in physically coupled relationship with the reservoirs in the plurality upon a movement of the reservoirs past the switching means, means including the switching means connected in an electrical circuit with the motor only in the first position of the switching means for obtaining an operation of the motor in producing the sequential movement of the different reservoirs in the plurality, and actuatable means operatively coupled to the switching means for producing a displacement of the switching means from the first position to the second position upon the movement of the particular one of the reservoirs in the plurality to the particular position for the dispensing of the fluid in the particular reservoir at the particular position.

15. In combination for dispensing a plurality of different fluids, a plurality of reservoirs each constructed to hold a different one of the fluids in the plurality, coupling means operatively associated with the different reservoirs in the plurality for providing a concurrent movement of the reservoirs and for providing a sequential movement of the reservoirs in the plurality past a particular position, motor means operatively associated with the coupling means to obtain a sequential movement of the different reservoirs in the plurality past the particular position, actuating means movable to first and second positions and disposed in the first position out of engaging relationship with the reservoirs in the plurality and disposed in the second position in the path of movement of the different reservoirs in the plurality and in engaging relationship with the different reservoirs in the plurality upon a movement of the reservoirs in the plurality in such path, switching means having first and second operating relationships and normally disposed in the first relationship and operatively associated with the actuating means to become converted to the second operating relationship upon an engagement between the actuating means and one of the reservoirs in the plurality, electrical circuitry including the motor means and the switching means for obtaining an operation of the motor means in the first operating relationship of the switching means and for obtaining an interruption in the operation of the motor means in the second operating relationship of the switching means, and means coupled to the actuating means for obtaining the movement of the actuating means from the first position to the second position upon a movement of a particular reservoir in the plurality toward a position for engaging the actuating means.

16. In combination for dispensing a plurality of different fluids, a plurality of reservoirs each constructed to hold a different one of the fluids in the plurality, holding means operatively coupled to the reservoirs in the plurality for holding the reservoirs in a spaced arcuate relationship for movement of the reservoirs in a rotary path, a motor operatively coupled to the holding means for obtaining a movement of the reservoirs in the plurality in the rotary path, switching means having open and closed relationships and connected in an electrical circuit with the motor in the closed relationship to obtain an operation of the motor, means coupled to the switching means for biasing the switching means in the closed position, actuating means movable from a first position out of engaging relationship with the reservoirs in the plurality to a second position in engaging relationship with the reservoirs in the plurality and operatively coupled to the switching means to obtain the open relationship of the switching means upon an engagement between the actuating means and one of the reservoirs in the plurality, and means operatively coupled to the actuating means for obtaining a change in the disposition of the actuating means from the first position to the second position upon a movement of a particular one of the reservoirs in the plurality toward the position for engaging the actuating means.

17. In a device for dispensing fluid into a receiving container, a central rotatable hub; a plurality of fluid carrying reservoirs spaced circumferentially for rotation about an axis defined by the central rotatable hub; a predetermined axis; a plurality of arms extending radially outwardly from the central rotatable hub; the reservoirs being removably secured on the arms; frame means for supporting the receiving container, said frame means being located with respect to said reservoirs to obtain a rotation of said reservoirs to a position above said receiving container on said frame means; an electric motor operatively coupled to said hub to rotate said hub on said reservoirs about said axis; said hub, said arms and said reservoirs comprising rotatable members of said device; indexing means adjacent to at least one of said rotating members; first means disposed on said indexing means for contacting said one of said rotating members; second means within said indexing means and connected in electrical circuitry with said first means and said motor and operative to break the electrical circuitry to said electric motor upon a movement of said first means into contact with one of said rotating members for an interruption in the rotation of said members so that a predetermined reservoir can be stopped, alignment with said receiving container on said frame means; and measuring means secured to each of said reservoirs to obtain a discharge of a predetermined amount of fluid into the receiving container on said frame means when the associated one of said reservoirs is in said stopped position above said receiving container.

18. In a device for dispensing fluid into a receiving container, a plurality of fluid carrying reservoirs spaced circumferentially for rotation around a predetermined axis; a central rotatable hub; a plurality of arms extending radially outwardly from the central rotatable hub; the reservoirs being removably secured on said arms; frame means for supporting the receiving container; said frame means being located with respect to said reservoirs to obtain a rotation of said reservoirs to a position above said receiving container on said frame means; an electric motor operatively coupled to said hub to rotate said hub and said reservoirs about said axis; indexing means disposed for contacting said arms while rotating; each of said arms being rotatable to a position adjacent said indexing means; first means on said indexing means being movable to contact each of said arms when said arms are rotated to said adjacent positions; second means within said indexing means and connected in electrical circuitry with said first means and said electrical motor and operative to break the electrical circuitry to said electric motor when said first means makes a contact with a particular one of said arms for stopping the rotation of said reservoir; and measuring means secured to each of said reservoirs to obtain a discharge of a predetermined amount of fluid into the receiving container on said frame means when the associated one of said reservoirs is in said stopped position above said receiving container.

19. In a dispensing device for dispensing fluid into a receiving container, a plurality of fluid carrying reservoirs spaced circumferentially for rotation around a predetermined axis; a rotatable hub centrally located with respect to said reservoirs; a plurality of arms extending radially outwardly from the rotatable hub; the reservoirs being removably secured to the arm; frame means constructed to support the receiving container; said frame means being located with respect to said reservoirs to obtain a rotation of said reservoirs above said receiving container; an electric motor operatively coupled to said hub for rotating said reservoirs about said axis; indexing means disposed in alignment with said arms adjacent and radially outwardly from said outer ends thereof for moving into contact with said arms; means connected in electrical circuitry with said motor and disposed within said indexing means and actuated by said indexing means upon a movement of said indexing means into contact with said arms for breaking the electrical circuitry to said motor to obtain an interruption in the rotation of a particular one of the reservoirs in a position directly above said receiving container; and measuring means secured to each of said reservoirs to obtain the discharge of a predetermined amount of fluid into the receiving container on said frame means when the associated one of said reservoirs is in said stopped position above said receiving container.

References Cited in the file of this patent
UNITED STATES PATENTS

| | | |
|---|---|---|
| 402,640 | Woodward | May 7, 1889 |
| 961,408 | Hebrank | June 14, 1910 |
| 1,583,352 | Hofheimer | May 4, 1926 |
| 2,158,774 | Grubelic | May 16, 1939 |
| 2,205,875 | Coffey et al. | June 25, 1940 |
| 2,373,171 | Daly | Apr. 10, 1945 |
| 2,374,430 | Hexter | Apr. 24, 1945 |
| 2,603,867 | Van Guilder | July 22, 1952 |
| 2,709,025 | Scott | May 24, 1955 |
| 2,787,402 | Stiner et al. | Apr. 2, 1957 |
| 2,847,040 | McCarthy | Aug. 12, 1958 |